Figure 1:
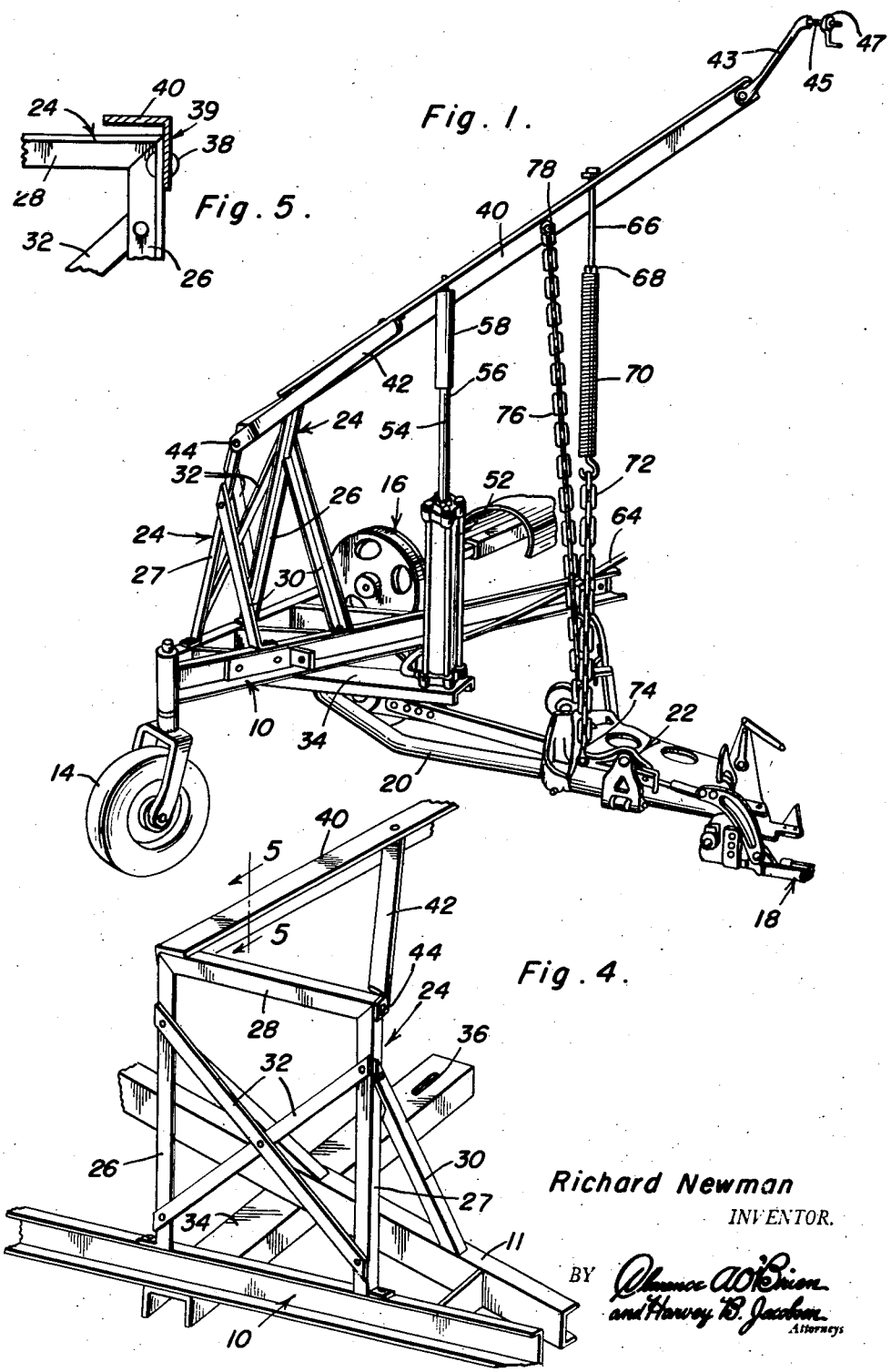

July 22, 1952  R. NEWMAN  2,603,929
HYDRAULIC LIFT FOR MOWING MACHINES
Filed Nov. 24, 1948  3 Sheets-Sheet 1

Richard Newman
INVENTOR.

July 22, 1952  R. NEWMAN  2,603,929
HYDRAULIC LIFT FOR MOWING MACHINES

Filed Nov. 24, 1948  3 Sheets-Sheet 3

Richard Newman
INVENTOR.

BY *Clarence A. O'Brien*
*and Harvey B. Jacobson*
Attorneys

Patented July 22, 1952

2,603,929

UNITED STATES PATENT OFFICE 2,603,929

HYDRAULIC LIFT FOR MOWING MACHINES

Richard Newman, Lakeview, Oreg.

Application November 24, 1948, Serial No. 61,886

10 Claims. (Cl. 56—25)

This invention relates to a hydraulic lift for a mowing machine, and has for its primary object to facilitate the moving of the sickle bar of a mowing machine to vertical position and holding said sickle bar in such position against vibration and side sway.

In the ordinary tractor drawn mowing machine of the type to which this invention relates, the sickle bar is moved to a vertical position and supported therein by mechanism carried by the tractor which engages the sickle bar near its lower end with the result, that considerable side sway, vibration and whip occurs to the sickle bar while the equipment is being moved from field to field or from field to barn.

A further object of the invention not only is to eliminate the side sway, but to enable the sickle bar easily and quickly to be raised or lowered according to the desires of the user.

The above and other objects may be attained by employing this invention which embodies among its features a boom mounted on the carriage on which a sickle bar is supported to swing in a vertical plane which aligns substantially with the vertical plane through which the sickle bar swings, a flexible member coupled at one end to the boom and at its opposite end to the gag link by which the sickle bar is moved through its vertical arc, and hydraulic means carried by the carriage and connected to the hydraulic system of a tractor to which the carriage may be connected for moving the boom in its vertical arc and consequently causing the sickle bar to swing in its vertical arc.

Other features include a yielding connection between the boom and the gag link to resiliently support the sickle bar in its operative position, and an arm carried by the boom adjacent the end thereof remote from the carriage with means on the arm detachably to couple the sickle bar thereto when the latter is in vertical inoperative position, to hold said sickle bar against side sway.

Figure 2:
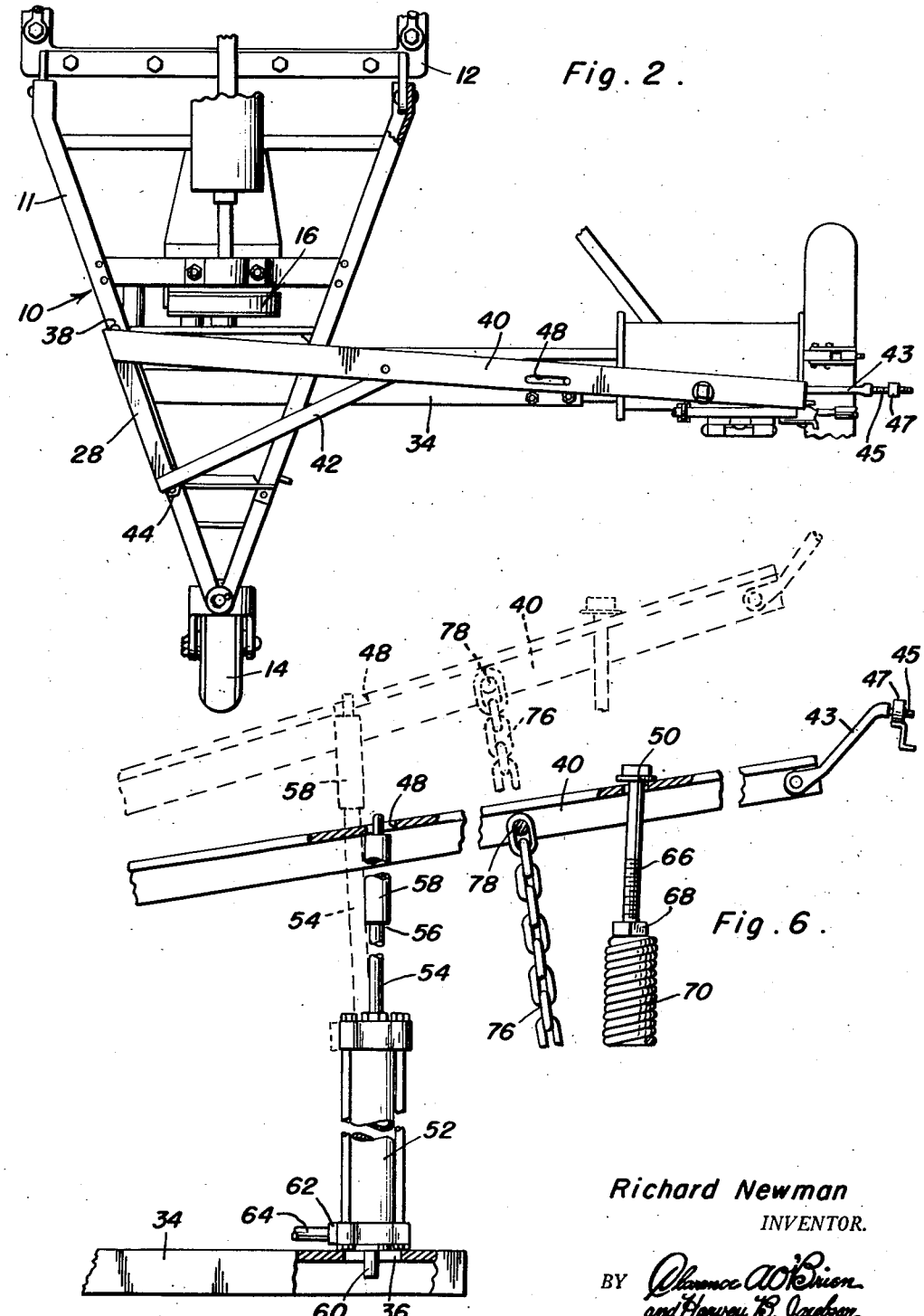
Figure 3:
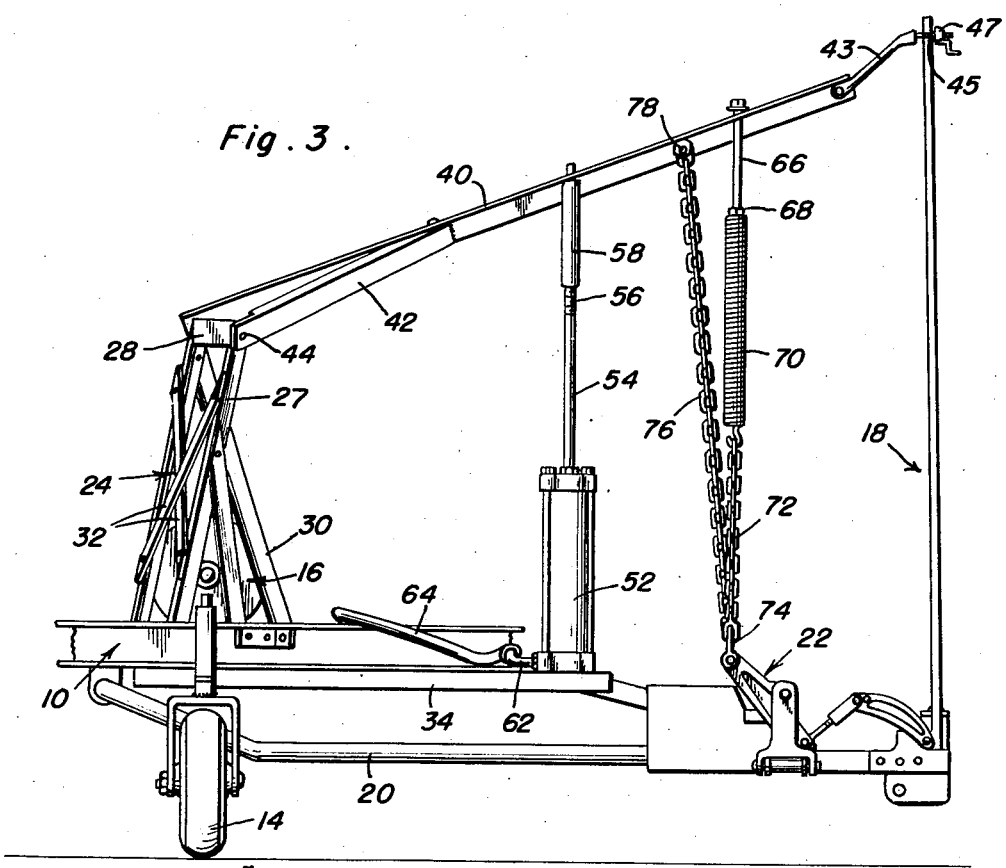
Figure 7:
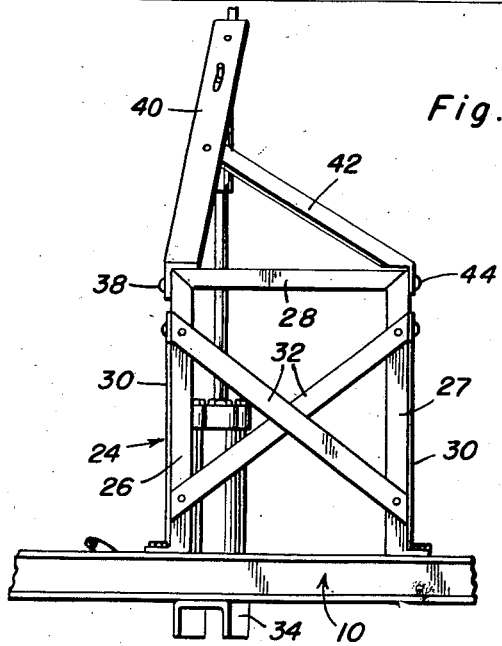

In the drawings:

Figure 1 is a perspective view of a conventional tractor mowing attachment showing this improved sickle bar supporting and moving equipment in place, Figure 2 is a top plan view of the device illustrated in Figure 1, Figure 3 is a rear view in elevation of the device illustrated in Figure 1, Figure 4 is a fragmentary perspective view of a portion of the carriage showing the mounting for the elevating boom, Figure 5 is a fragmentary enlarged sectional view taken substantially along the line 5—5 of Figure 4, Figure 6 is a fragmentary enlarged side view partially in section illustrating in detail the mounting of the hydraulic cylinder and various connections with the boom, and Figure 7 is a rear end view of the attachment, parts being removed in order to more clearly illustrate the boom supporting and moving equipment.

Referring to the drawings in detail a carriage designated generally 10 comprising an A-frame 11 having the base thereof coupled to the draw bar 12 of a conventional farm tractor is equipped with a conventional caster wheel 14, and supports the conventional drive mechanism designated generally 16 for a sickle bar designated generally 18 which is supported on the carriage by a conventional coupling bar 20. The sickle bar 18 is moved in a vertical plane in a conventional manner through the medium of a conventional gag lever 22 one end of which is adapted to be connected to the conventional sickle bar lifting mechanism of a conventional farm tractor. The mechanism so far described is such as will be commonly found on a tractor mower of the type produced by the International Harvester Company and sold under the trade-mark "McCormick-Deering" as the McCormick Universal Mower No. 27-V. The No. 27-V mower is clearly illustrated and described in Pamphlet No. A-618-NN 9-30 published for and distributed by the International Harvester Company of Chicago, Illinois. The mower is shown and described as being connected to a tractor having a power take-off and a hydraulic system.

In order to elevate the sickle bar 18, and hold it against vibration when it is in position for transportation, I secure to the A-frame 11 a framework designated generally 24 which comprises a pair of spaced standards 26 and 27, the upper ends of which are connected together by a transversely extending crossbar 28 and the standards are held in proper vertical position by angular brace bars 30 and cross braces 32. Fixed to the underside of the A-frame of the carriage 10 directly beneath one of the standards 26, and extending laterally beyond one side of the A-frame is a channel member 34 which is provided adjacent its end remote from the A-frame with an elongated longitudinal slot 36, the purpose of which will be more fully hereinafter explained. Pivotally coupled as at 39 by rivet 38 to the upper end of the standard 26 which is located above the channel 34 is one end of a boom 40, and connected to the boom and extending angularly therefrom is a brace bar 42 which is pivotally coupled as at 44 to the upper end of the opposite standard 27. Riveted or otherwise fixed to the end of the boom 40 remote from the pivot 38, and extending longitudinally and upwardly therefrom is an arm 43 carrying a screw threaded shank 45 on which a nut 47 is threaded. Formed in the boom intermediate its ends, is an elongated longitudinal slot 48 which lies in substantial vertical alignment with the slot 36 in the channel bracket 34. Extending through the boom 40 between the elongated slot 48 and the end thereof carrying the arm 43 is an opening 50, the purpose of which will be more fully hereinafter described.

Seated on the channel bracket 34 directly above the slot 36 therein is a hydraulic cylinder 52 in which a piston (not shown) works, and fixed to the piston and operating through the upper end of the cylinder 52 is a piston rod 54, which is provided adjacent its upper end with external screw threads 56 onto which a stop collar 58 is threaded. The upper end of the piston rod 54 extends through the slot 48 in the boom 40, while the lower end of the cylinder 52 is provided with a depending stud 60 which projects through the slot 36 in the channel bracket 34, and coupled to the inlet port 62 of the cylinder 52 is a flexible tube 64 which is connected to the hydraulic system of a farm tractor to which the mowing attachment is connected.

Extending through the opening 50 in the boom 40 is a long bolt 66, the threaded end of which is threadedly engaged in a nut 68 carried at the upper end of a retractile coil spring 70, the lower end of which is connected through the medium of a chain or other suitable flexible connection 72 to a clevis 74 which is pivotally coupled to the gag lever 22, so as to yieldingly support the sickle bar 18. It will thus be seen that when the boom 40 is moved upwardly about the pivots 38 and 44, pull will be exerted on the spring 70 to cause the clevis 74 to move the gag lever 22 about its pivot and thus elevate the sickle bar into a substantially vertical position. A safety chain 76 is coupled at one end as at 78 to the boom 40, and the opposite end of the chain 76 is connected to the clevis 74, and this chain is slightly longer than the combined length of the bolt 66, spring 70 and chain 72, so that under ordinary circumstances the sickle bar will be yieldingly suspended by the spring 70, but when upward movement is exerted on the boom 40, and the spring 70 extends beyond a predetermined limit, the chain 76 will become taut in order to exert a definite upward pull on the gag lever 22, positively to move the sickle bar to vertical position.

In use a tractor mowing attachment 10 equipped with my improved sickle bar elevating device is coupled to a farm tractor of conventional form having a power take-off and a hydraulic system. The end of the flexible tube 64 remote from the cylinder 52 is coupled to the hydraulic system and the drive mechanism 16 of the mowing attachment is coupled to the power take-off of the farm tractor. The chains 72 and 76 are next connected by the clevis 74 to the gag lever 22 as illustrated in the drawings and upon relieving any fluid pressure within the cylinder 52, it will be obvious that the boom 40 will move downwardly under the influence of gravity so that the sickle bar 18 will remain in substantially horizontal operative position. In this position the tractor may be driven and the mowing may take place in a conventional manner. When it is desired to transport the mowing attachment from one field to another or from a field to a barn, fluid pressure is admitted through the pipe 64 into the cylinder 52, thus moving the piston upwardly and causing the piston rod 54 to lift the boom 40 through the medium of the adjustable collar 58. Such upward movement will exert upward pull on the spring 70, thus tending to elongate it. After the spring has elongated to a predetermined point, the chain 76 becomes taut and further upward movement of the boom 40 will rock the gag lever 22 into the position substantially shown in Figure 3 so as to cause the sickle bar 18 to move upwardly to substantially vertical inoperative position. When in this position, the operator of the tractor or other attendant clamps the edge of the sickle bar between the nut 47 and the end of the arm 43 near the upper end of the sickle bar 18, positively to hold said sickle bar against vibration and side sway due to the motion of the tractor. Due to the fact that the sickle bar is supported not only at its bottom end, but also near its upper end, it will be obvious that it will be held stationary while the device is in transit. At the same time it is but a simple matter to disengage the nut 47 from clamping engagement with the sickle bar 18 so that when it is desired to place the sickle bar in service it is only necessary to manipulate the hydraulic control to permit the fluid which has been forced into the cylinder 52 to be discharged through the port 62 back into the hydraulic system of the tractor, thus permitting the piston rod 54 to move downwardly under the weight of the boom 40, thus relieving the tension on the chain 76 and permitting the sickle bar 18 to swing downwardly into substantially horizontal position. Obviously the exact position of the sickle bar may be governed by regulating the amount of fluid remaining in the cylinder 52, and due to the yielding suspension of the sickle bar effected by the spring 70, it will be obvious that it may rock through a limited length of its arc of movement.

While in the foregoing there has been shown and described the preferred embodiment of this invention it is to be understood that minor changes in the deails of construction, combination and arrangement of parts may be resorted to without departing from the spirit and scope of the invention as claimed.

Having described the invention, what is claimed as new is:

1. In a mowing attachment adapted to be coupled to a farm tractor having a power take-off, said attachment being of the type embodying a wheeled carriage, a sickle bar mounted on the carriage to swing in a vertical plane from a substantially horizontal operative position to a substantially vertical inoperative position, means carried by the carriage and coupled to the sickle bar and adapted to be coupled to the power take-off of the tractor for driving said sickle bar, a gag link pivoted to the carriage and coupled to the sickle bar for swinging the sickle bar in its vertical plane, means for actuating the gag link and swinging said sickle bar comprising a boom mounted on the carriage to swing in a vertical plane which is substantially parallel with the first mentioned vertical plane in which the sickle bar swings, a tension spring coupled at one end to the boom and at its opposite end to the gag link and means carried by the carriage for moving the boom in its vertical plane.

2. In a mowing attachment adapted to be coupled to a farm tractor having an hydraulic system and a power take-off, said attachment being of the type embodying a wheeled carriage, a sickle bar mounted on the carriage to swing in a vertical plane from a substantially horizontal operative position to a substantially vertical inoperative position, means carried by the carriage and coupled to the sickle bar and adapted to be coupled to the power take-off of the tractor for driving said sickle bar, a gag link for swinging the sickle bar in its vertical plane, means for actuating the gag link and swinging said sickle bar comprising a boom mounted on the carriage to swing in a vertical plane which is substantially coplanar with the first mentioned vertical plane in which the sickle bar swings, said boom overlying the gag link, a tension spring coupled at one end to the boom and at its opposite end to the gag link, a bracket carried by the carriage beneath the boom, and hydraulic means carried by the bracket and coupled to the boom and actuatable by the hydraulic system of the tractor for moving the boom in its vertical plane.

3. In a mowing attachment adapted to be coupled to a farm tractor having an hydraulic system and a power take-off, said attachment being of the type embodying a wheeled carriage, a sickle bar mounted on the carriage to swing in a vertical plane from a substantially horizontal operative position to a substantially vertical inoperative position, means carried by the carriage and coupled to the sickle bar and adapted to be coupled to the power take-off of the tractor for driving said sickle bar, a gag link pivoted to the carriage for swinging the sickle bar in its vertical plane, means for actuating the gag link and swinging said sickle bar comprising a boom mounted on the carriage to swing in a vertical plane which aligns substantially with the vertical plane through which the sickle bar swings, a tension spring coupled at one end to the boom and at its opposite end to the gag link, a bracket carried by the tractor beneath the boom, a vertical cylinder mounted on the bracket below the boom, a piston working in the cylinder, a piston rod coupled to the piston and working through the upper end of the cylinder and extending through the boom, a stop collar adjustable on the piston rod below the boom for engaging the boom and lifting it, and means coupled to the cylinder and adapted to be coupled to the hydraulic system on the tractor to admit fluid under pressure to the cylinder.

4. In a mowing attachment adapted to be coupled to a farm tractor for actuation, a wheeled carriage, a sickle bar mounted on the carriage to swing in a vertical plane from a substantially horizontal operative position to a substantially vertical inoperative position, means carried by the carriage for driving said sickle bar and a gag link for swinging the sickle bar in its vertical plane, means yieldingly supporting the sickle bar and for actuating the gag link, said means comprising a substantially horizontal boom mounted on the carriage above the gag link to swing in a vertical plane which is substantially coplanar with the vertical plane in which the sickle bar swings, a yielding extensible member coupled at one end of the boom and at its opposite end to the gag link, means carried by the carriage for swinging said boom relative to the carriage.

5. In a mowing attachment adapted to be coupled to a farm tractor having a power take-off, said attachment being of the type embodying a wheeled carriage, a sickle bar mounted on the carriage to swing in a vertical plane from a substantially horizontal operative position to a substantially vertical inoperative position, means carried by the carriage and coupled to the sickle bar and adapted to be coupled to the power take-off of the tractor for driving said sickle bar and a gag link for swinging the sickle bar in its vertical plane, means for yieldingly supporting the sickle bar in a horizontal operative position and to move the sickle bar to vertical inoperative position comprising a boom overlying the gag link and mounted on the carriage to swing in a vertical plane which is substantially coplanar with the vertical plane in which the sickle bar swings, a yielding extensible member coupled at one end to the boom and at its opposite end to the gag link yieldingly supporting the sickle bar from the boom and for actuating the gag link, a flexible safety member of greater length than the length of the extensible member coupled at one end to the boom and at its opposite end to the gag link, and means carried by the carriage for moving the boom in its vertical plane.

6. In a mowing attachment, a wheeled carriage, a sickle bar mounted on the carriage to swing in a vertical plane from a substantially horizontal operative position to a substantially vertical inoperative position, a gag link pivoted to the carriage and connected to the sickle bar for swinging the sickle bar in its vertical plane, means for actuating the gag link and swinging said sickle bar comprising a boom overlying the gag link and mounted on the carriage to swing in a vertical plane which is substantially coplanar with the vertical plane in which the sickle bar swings, a tension spring coupled at one end to the boom and at its opposite end to the gag link, means carried by the carriage for moving the boom in its vertical plane, and means carried by the boom for engaging the sickle bar near its upper end and holding it in its vertical inoperative position.

7. In a mowing attachment adapted to be coupled to a farm tractor for actuation, a wheeled carriage, a sickle bar mounted on the carriage to swing in a vertical plane from a substantially horizontal operative position to a substantially vertical inoperative position, means carried by the carriage and operatively connected to the sickle bar for driving said sickle bar including a gag link for swinging the sickle bar in its vertical plane, means for actuating the gag link and swinging said sickle bar comprising a horizontally extending boom pivoted at one end to the carriage to swing in a vertical plane which is substantially coplanar with the vertical plane in which the sickle bar swings, a tension spring coupled at one end to the boom and at its opposite end to the gag link, means carried by the carriage for moving the boom in its vertical plane, an arm pivoted on the boom adjacent the end thereof remote from the carriage and means carried by the arm for detachably coupling said arm to the sickle bar when the latter is in vertical inoperative position to hold said sickle bar against side sway.

8. In a mowing machine of the type including a frame and a sickle bar mounted on the frame for vertical swinging movement and having a gag link for swinging the sickle bar from a substantially horizontal operative position to a substantially vertical inoperative position; an improvement comprising a horizontally extending boom having its inner end pivoted to the frame and being swingable in a vertical plane substantially coplanar with the plane of movement of the sickle bar with the outer end of the boom being disposed substantially directly above the gag link, means to actuate said gag link comprising a vertically extending tension spring having one end connected to the boom and having its other end connected to the gag link, whereby the sickle bar is floatingly supported in its operative position, and means for moving the boom about its pivotal connection to the frame, whereby the tension spring is tensioned to actuate the gag link and raise the sickle bar to the inoperative position.

9. The combination of claim 8, wherein said last means includes a hydraulic jack the cylinder of which is rigidly secured to the frame with the plunger thereof slidingly engaging the boom, and means carried at the outer end of the boom for releasably clamping the sickle bar at a position remote from the gag link when the sickle bar is in the inoperative position.

10. In an agricultural implement, a frame, an elongated boom pivoted at its inner end to the frame for vertical swinging movement, a hydraulic jack secured to the frame and including a plunger attached to the boom intermediate its ends for swinging the same in a vertical arc, a sickle bar associated with the frame for vertical swinging movement and a gag link associated with the sickle bar for swinging the same in a vertical arc, a resilient connection between the outer end of the boom and the gag link for actuation of the gag link, said outer end of the boom overlying the gag link, whereby the sickle bar is raised responsive to upward swinging movement of the boom with the resilient connection permitting vertical swinging movement of the sickle bar independently of the boom.

RICHARD NEWMAN.

REFERENCES CITED

The following references are of record in the file of this patent:

UNITED STATES PATENTS

| Number | Name | Date |
|---|---|---|
| 1,958,405 | Anthony et al. | May 15, 1934 |
| 2,256,413 | Simpson | Sept. 16, 1941 |
| 2,291,987 | Rogers | Aug. 4, 1942 |
| 2,299,859 | Speiser | Oct. 27, 1942 |
| 2,304,421 | Rogers | Dec. 8, 1942 |
| 2,324,563 | Custenborder | July 20, 1943 |
| 2,375,912 | Gifford et al. | May 15, 1945 |
| 2,410,918 | Acton | Nov. 12, 1946 |
| 2,413,873 | Hume | Jan. 7, 1947 |
| 2,422,044 | Ronning et al. | June 10, 1947 |
| 2,457,693 | Leicy | Dec. 28, 1948 |